United States Patent [19]
Al-Hilali et al.

[11] Patent Number: 6,086,618
[45] Date of Patent: Jul. 11, 2000

[54] METHOD AND COMPUTER PROGRAM PRODUCT FOR ESTIMATING TOTAL RESOURCE USAGE REQUIREMENTS OF A SERVER APPLICATION IN A HYPOTHETICAL USER CONFIGURATION

[75] Inventors: Hilal Al-Hilali, Seattle; Perry Clarke, Bellevue; David Edward Guimbellot, Woodinville; David Andrew Howell, Seattle, all of Wash.

[73] Assignee: Microsoft Corporation, Redmond, Wash.

[21] Appl. No.: 09/013,441

[22] Filed: Jan. 26, 1998

[51] Int. Cl.$^7$ .................................................. G06F 101/00
[52] U.S. Cl. ................................... 703/2; 703/4; 709/220; 709/223; 709/226
[58] Field of Search ..................... 395/500.23, 500.25, 395/200.25; 702/186; 709/220, 223, 226; 703/2, 4

[56] References Cited

U.S. PATENT DOCUMENTS

| | | | |
|---|---|---|---|
| 5,598,532 | 1/1997 | Liron .................................... | 395/500.23 |
| 5,761,091 | 6/1998 | Agrawal et al. ........................ | 702/186 |
| 5,870,555 | 2/1999 | Pruett et al. ............................ | 709/223 |
| 5,893,077 | 4/1999 | Griffin ..................................... | 705/34 |

OTHER PUBLICATIONS

El–Abd, "Moldeling Resources Allocation and Performance Measures in distributed Computer Networks", IEEE Proceeding of the Singapore International Conference on Networks, pp. 581–586, Jul. 1995.

*Primary Examiner*—Kevin J. Teska
*Assistant Examiner*—Samuel Broda
*Attorney, Agent, or Firm*—Workman, Nydegger & Seeley

[57] ABSTRACT

A method for developing system resource usage "cost" equations, creating models based upon such cost equations, and estimating total system resource usage and computer program product incorporating such cost equations. A server application is analyzed and certain transactions are defined therein that occur in response to interaction with a client application that in many instances originates from user behavior. System resources are also identified and resource usage measurements are determined for each transaction. One way of determining the resource usage measurements is by creating a load of a particular transaction on an "instrumented" server application and measuring the resources used in connection with the transaction. Cost equations for each type of system resource can then be constructed taking a component from each transaction that uses a particular system resource so that the cost equations are defined in terms of transactions. By reducing user behavior to transactions, accurate estimates of total hardware resource usage for a server application in a particular scenario can be easily attained.

25 Claims, 6 Drawing Sheets

METHOD AND COMPUTER PROGRAM PRODUCT FOR ESTIMATING TOTAL RESOURCE USAGE REQUIREMENTS OF A SERVER APPLICATION IN A HYPOTHETICAL USER CONFIGURATION

BACKGROUND OF THE INVENTION

1. The Field of the Invention

The field of the invention is the estimation of hardware and software resource needs for a server application given the anticipated number of users. More particularly, the field of the invention relates to methods for creating hardware and software resource usage models that can be used to estimate hardware and system resource usage in a wide range of different hypothetical usage scenarios.

2. Present State of the Art

Increasingly, client-server computing has become a normal trend for the delivery of computational services. A server computer will have a desired application and a client computer will have software capable of accessing the server computer for the desired services. This may take place over a communication network, such as an Ethernet Local Area Network ("LAN"), or it may occur over a more direct connection through a modem. In either case, the bulk of the computing is provided by the server computer or server application and the results are communicated to the client portion or client application that will then display the results for the user.

It becomes a somewhat difficult process in many instances to anticipate adequate resources for running the server application for a certain level of load created by a particular number of users desiring the services provided by the server application. The resources used are typically hardware resources, such as CPU time, network bandwidth, disk and memory usage, etc., but may also include software resources, such as operating system facility usage.

It is important to anticipate adequate resources for the server application in order to reduce frustration on the part of the user and to allow the client-server software to work most effectively. One of the most common user frustrations is having an unusually long delay in receiving the results of the services provided by the service application or simply not having the server application available to provide the desired services, both due to inadequate hardware and system resources. Furthermore, actual errors in the services provided may occur due to the lack of resources available for running the server application.

While such problems apply to many different server applications, throughout this patent application, the example of an e-mail server as part of an on-line service, such as Compuserve® or America Online (AOL), will be used for illustrative purposes. Such an illustrative context is not to be interpreted as limiting to the present invention since any server application can be used as part of creating an estimation model. Some other server applications that could be used and where it is important to accurately estimate the amount of necessary resources would include web page servers, network file servers, etc.

With an e-mail server as part of an on-line service, a user having client software will dial up and gain access through a communications network to the e-mail server in order to download received e-mail messages and upload messages for delivery to other users. One scenario of how an e-mail application server is accessed by an on-line service subscriber or user is as follows. The user will begin by preparing messages for delivery to others using the client application program provided by the on-line service on the client computer. After such messages are prepared, the user will log onto the on-line service and access the e-mail server application with the client application most likely through a direct modem connection to a locally available communications network that allows communication between the client application and the server application. With the connection thus made, the client application will upload the messages to the e-mail server application for delivery. Finally, the e-mail server application will deliver the messages either locally to another on-line service subscriber account or remotely across the Internet or other communication network to a non-local destination.

The general scenario for reading new messages delivered to an on-line service subscriber or user includes first logging onto the on-line service in order to make the logical connection through the communications network between the client application and the e-mail server application. Next, any messages received for a particular user are downloaded to the client application so that the connection need not be maintained indefinitely. Typically, once the messages are downloaded, the logical connection between the client application and the e-mail server application is terminated. Finally, the user may use and peruse the messages leisurely on the client computer using the client application. These processes of sending and receiving messages will be explained in more detail hereafter.

A subscription service may reasonably and accurately estimate the number of anticipated users and the user behavior in terms of the number of logons per day and messages sent per logon and other relevant metrics by monitoring current subscriber behavior or by other rational means. It is often very difficult to predict, however, how much hardware resources would need to be dedicated to an e-mail server application in order to adequately service the anticipated user demand. The different amount of resources that an e-mail server application (or any other application) would use include CPU time for executing server application code to handle the logons, downloads, message sends, etc, network bandwidth for communication between the client and server for each download/upload or logon, memory necessary to perform the relevant operations, and the disk storage necessary for storing the received messages per user that would fluctuate with the actual user activity.

One can readily see that creating an accurate model that is scalable for different numbers of anticipated users can be a very difficult task due to the many variables involved and the nature of the server application selected. It is nonetheless important to make as accurate estimation as possible the amount of hardware resources required for adequate service.

One way of attempting to accurately gauge the amount of hardware resources necessary for supporting a particular server application is through the use of relevant "benchmark" tables. One or more hypothetical hardware configurations running the designated server application are set up and performance tested with a load created by a number of actual or simulated users. Relevant data are measured such as user response time, total CPU usage, disc usage, etc. so that each benchmark configuration is "rated" to support so many users. A potential user or marketing representative selling the server application may then utilize the tested configuration to estimate what may be the actual system purchaser's needs.

The benchmarking method, however, is fraught with potential error and amounts to little more than educated guess work unless the user's anticipated needs are very near the loads created for the bench mark configuration. For example, the benchmark user behavior may be markedly different than the system purchaser's user behavior rendering the configuration "rating" information essentially meaningless. Furthermore, if the purchaser's anticipated number of users is dramatically different than the "rated" number of users for the benchmark system, then a system purchaser could easily over or under purchase hardware for their particular needs.

The accuracy of bench marking may be increased somewhat by utilizing a series of three or more configurations from which to gather data. For example, there could be a low, medium, and high level of users with corresponding hardware configurations that would support the server application at a desirable performance level. The drawback for this approach is that setting up and running tests for different configurations can be expensive in terms of time and capital expenditures for the relevant hardware. Furthermore, the number of different configurations that need to be tested can be quite extensive. Such a number of configurations is exponentially increased when testing is done in combination with other server applications that will also be utilizing the same hardware resources.

In summary, benchmarking can be done in two basic approaches. The first approach picks a popular hardware platform having a fixed set of resources. The typical user behavior for the server application is then determined by reasonable guess work or empirical testing. Next, tests are run to see how many users doing the specific behavior and interacting with the chosen hardware configuration can reasonably support within certain performance characteristics. This "capacity" or "rating" is then published for the given hardware. The second approach uses tests run on multiple hardware configurations and determines the "capacity" based on a price performance curve across the capacity numbers of the various configurations.

In either approach, a number of concurrent users with a specific behavior on a specific set of hardware is used, and the purchaser is forced to either guess or extrapolate if their situation is anything different than the benchmarked systems in terms of either user behavior or existing hardware that may be used. Sometimes there is really no solid information as to the user behavior used in the benchmark. In many instances, buying new hardware is not always a viable solution due to the sizable investment previously made in existing hardware and in no case do the combined effects of different server applications exhibit themselves in benchmark tests of individual server applications.

It would generally be desirable to abstract a model so that resource requirements to run a particular application could be accurately estimated given anticipated users. Additionally, it would be desirable for the resource usage model to accommodate customized user behavior to enhance the accuracy of resource usage estimates. Furthermore, effective and accurate ways of developing such models that can be readily implemented into a computer are also sought. What is needed is a way of quickly developing an accurate model for hardware and software resource utilization that can be accurately scalable across a wide spectrum and can be used by server application sales representatives to accurately assist a customer in providing adequate hardware resources to accommodate the anticipated load.

SUMMARY AND OBJECTS OF THE INVENTION

It is an object of the present invention to provide a methodology for accurately estimating the total resource usage of a server application.

It is another object of the present invention to create a model for estimating total resource usage of a server application.

It is a further object of the present invention to separately measure individual resource usage costs of predefined transactions at the server application that occur in response to user behavior on the client application so that total resource usage caused anticipated server application loads modeled by hypothetical user behavior can be accurately estimated.

It is yet another object of the present invention to create cost equations for each resource used by a server application that may be combined in order to estimate the total resource usage of the server application. Cost equations from multiple server applications may also be combined together to estimate total resource usage for the multiple server applications running on the same system.

It is an object of the invention to allow the creation of resource usage models for server applications that do not require simulation of an actual user load in order to determine accurate estimates of total resource usage.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method and computer program product for estimating total resource usage requirements of a server application in a hypothetical user configuration is provided.

The present invention is directed to a novel method for creating resource cost equations that can make up a model for estimating hardware requirements needed to support a given number of users for particular server applications. The created model can be used by field personnel in order to assist in designing customer hardware systems that will meet the customer's anticipated needs, by system administrators in meeting anticipated growth needs and for computer resource acquisition planning, or by any other party having a need to accurately estimate resource requirements for the deployment of a server application in a wide range of differing circumstances.

The present invention overcomes the limitations in the prior art by creating a model of the actual resource utilization required by the different kinds of server application software a customer would use. Use of the model allows accurate estimates to be made without actually creating the user configuration or simulating an equivalent load caused by the actual user configuration. Once the server application has been "defined" by the resource cost equations, only simple calculations are necessary to arrive at resource usage requirements for particular situations.

The model is made by first determining the resources used by the server application and defining "transactions" that occur at the server application. A transaction is an identifiable operation occurring at the server application in response to user/client behavior and can typically be measured in rate form (transactions per second). Furthermore, an anticipated user load based on user behavior can also be reduced to transaction rates with a server application.

Next, the "cost" of performing the transactions in terms of the relevant system resources is measured. One way this can be done is by creating a transaction load across the network and timing or monitoring different resource usage, such as CPU usage, disk access time, memory usage, etc. The server application is "instrumented" to have transaction counters or other mechanisms to assist in arriving at a per transaction cost or transaction rate cost.

From this resource usage information and measurements, cost equations for each system resource are constructed for modeling the server application resource requirements. Depending on whether or not a transaction uses a particular system resource, each cost equation will have a component from each transaction. In other words, the system resource cost equations become defined in terms of transactions and/or transaction rates. Therefore, any user scenario that can be reduced or defined in terms of transactions can use the resource cost equations to quickly and accurately generate total resource usage for the particular configuration, situation, or scenario.

The cost equations can then be deployed in a variety of tools to assist in making the calculations quickly and easily. One common application is to assist purchasers of server applications in assessing system resource needs for anticipated usage.

A particular purchaser scenario can be incorporated into a user profile detailing the number of users and the user's behavior in terms that are already at or can be reduced to transactions for the given server application. With the user profile based on transaction activity and the cost equations based on resource usage measurements, accurate calculations can be made as to the amount of system resources necessary to support the purchaser's needs.

Note that cost equations for multiple server application products may be aggregated to assess the effects of multiple server applications on a common system. Since the different combinations of server applications that can be run on a common system are almost limitless, it is impractical and very nearly impossible to use current techniques in estimating system resource requirements for such combinations These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 7 is a logical diagram similar to that shown in FIG. 3 with specific application to the example used through out of a mail service server application. In FIG. 7, the mail service server application is properly instrumented and has a resource usage monitor associated therewith while the load generator is used to exercise the defined transactions associated with a set of user behavior.

DETAILED DESCRIPTION OF THE PREFERRED EMBODIMENTS

As used herein, the term "server application" refers software applications according to the client-server model running on a server computer system, such as a standard personal computer. A "client application" is the client-side portion of the server application or other client that interacts with the server application running on a corresponding client system. Examples of a server application include, but are not limited to, office file servers, electronic mail servers accessible by a Local Area Network (LAN), electronic mail service server available over a dial-up modem connection, world wide web page servers accessible over the Internet, etc. Client applications include, but are not limited to, web page browsers, electronic mail packages, operating systems that access file servers, etc.

As used herein, the term "transaction" refers to operations performed at the application server that can be readily identified, measured for occurrence, and can have corresponding system resource usage that can be reliably attributed to the operation.

Figure 1:
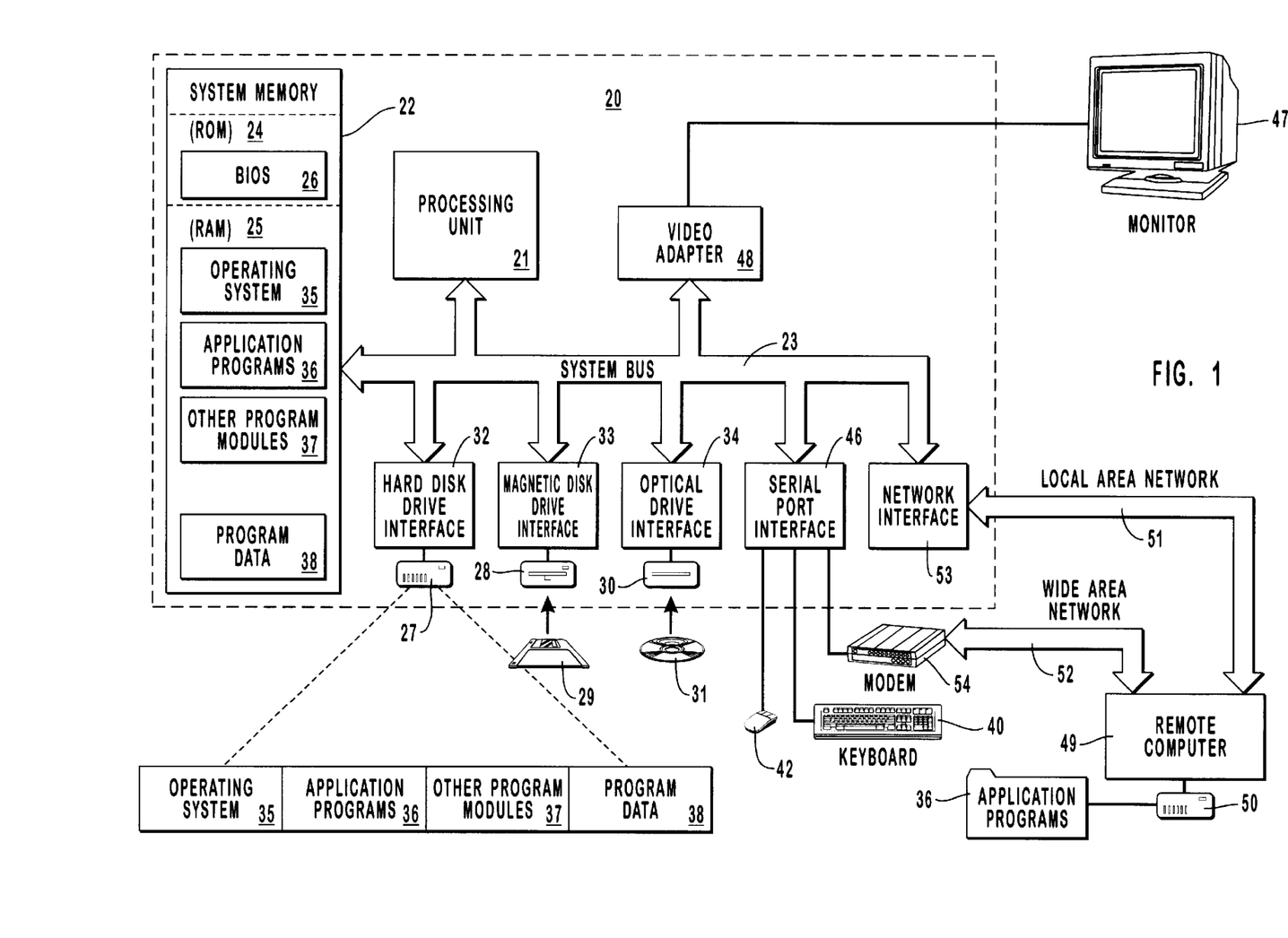
FIG. 1 is a block diagram of an exemplary system for implementing portions of the present invention that includes a general purpose computing device in the form of a conventional personal computer.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. the system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to removable optical disk 31 such as a CD ROM or other optical media. The hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices enterprise-wide computer networks, intranets and the Internet.

When used in a LAN networking environment, the personal computer 20 is connected to the local network 51 through a network or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
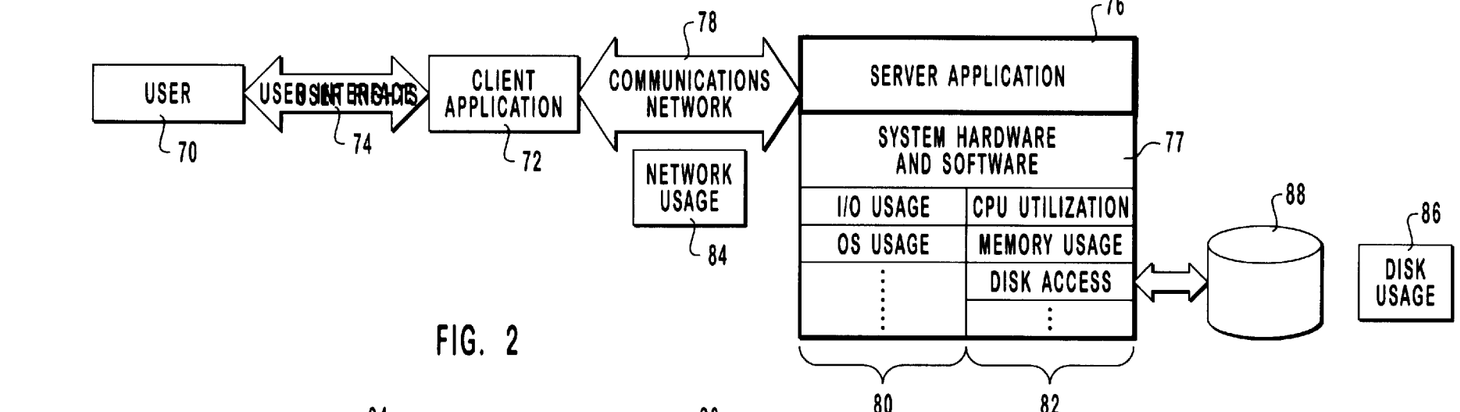
FIG. 2 is a logical diagram showing a user interacting through a user interface with a client application (e.g., the client-side of a server application) which in turn communicates with a server application over a communications network according to the client-server model.

Referring now to FIG. 2, a logical diagram showing the interaction of a user with a server application is shown that shows the operating environment of a server application and sets the stage for explaining the present invention. A user 70 will interact with a client application 72 through a user interface 74 in standard fashion with the client application running on a computer system, such as the personal computer shown in FIG. 1.

The way a user 70 interacts with the client application 72 will in turn influence how the client application 72 interacts with the server application 76 over a communications network 78. User behavior, therefore, refers to the user 70 using the client application for its intended purpose to accomplish a desired task. For example, composing and sending electronic mail messages would be an example of user behavior.

Therefore, when assessing the resource requirements of the server application 76, the originator of whatever load that the server application will service is likely to be an actual end user 70. Since users, such as user 70, will behave or interact differently with a client application, such as client application 72, it is important to take into account actual user behavior when creating a model for assessing total resource usage by the server application.

Note that such user behavior will be converted or reduced into specific interactions between the client application 72 and the server application 76 over the communications network. Furthermore, when such activity is received by the server application 76, different resources will be used as part of the server application interacting with the system hardware and software 77. For example, the server 76 may make system calls for IO usage and other system services such as network communications, modem communications, timers, etc., as indicated by brackets 80. Eventually, the server application 76 activity may eventually translate into hardware resource usage such as CPU usage, memory usage, disk access and disk usage, network usage, etc. Such hardware resource usage is shown by brackets 82 and the network usage indication 84 for the communications network and the disk usage indication 86 for use of hard disk 88. Even though the examples used in presenting the operation of the present invention center around hardware resource usage, those skilled in the art will appreciate that any system resource, including software resources or other resources, may be estimated or used.

Figure 3:
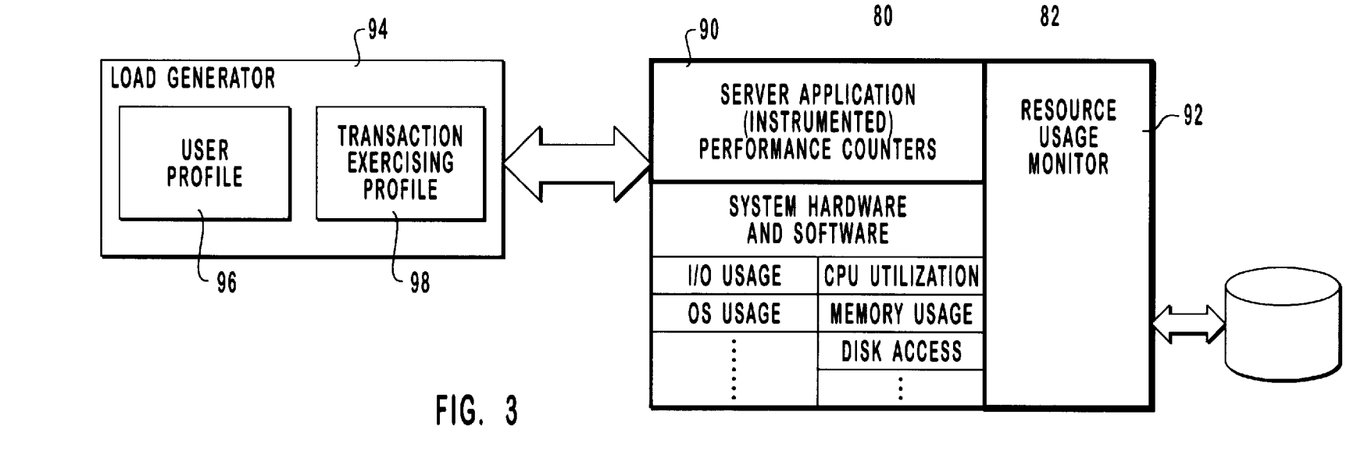
FIG. 3 is a logical diagram showing a load generator capable of supporting a user profile that will interact with the server application simulating actual user behavior or generate intense loads against a server application that has been specifically instrumented for measuring and monitoring resource usage.

Referring now to FIG. 3, a server application that has been instrumented to measure usage costs in terms of system resources is shown. A server application 90 is "instrumented" with performance counters that track the number of times certain transactions are performed. This instrumentation may occur by adding special hooks into the server application code that another program may access, such as an internal counter with some sort of external interface. The counters are necessary so that rate calculations may be made for the defined operations called transactions that occur at the server application 90. The transaction rates that may then be divided into a total resource usage measurement attributed to that particular transaction to calculate a per transaction cost in terms of a relevant system resource. Examples of such calculations will be shown in more detail hereafter.

Some form of resource usage monitor 92 (or monitors) is used in conjunction with the server application and system hardware and software in order to measure the utilization or use of various system resources. A resource usage monitor may be a software application, a system utility, a hardware device external to the system that can measure resource usage, etc. For example, what percentage of the time a particular CPU was in use, how many disk accesses are made, and how much information was stored or retrieved per access, how much memory was used, etc.

A load generator 94 will "exercise" the instrumented server application 90 with a specified transaction or set of transactions. The load generator 94 as shown may take information from a user profile 96 or a transaction exercising profile 98 or both in order to determine which transactions to generate for creating a desired load on the instrumented server application 90. Again, more specific usage of the user profile 96 and the transaction exercising profile 98 will be explained hereafter in connection with the following flow charts and example.

Figure 4:
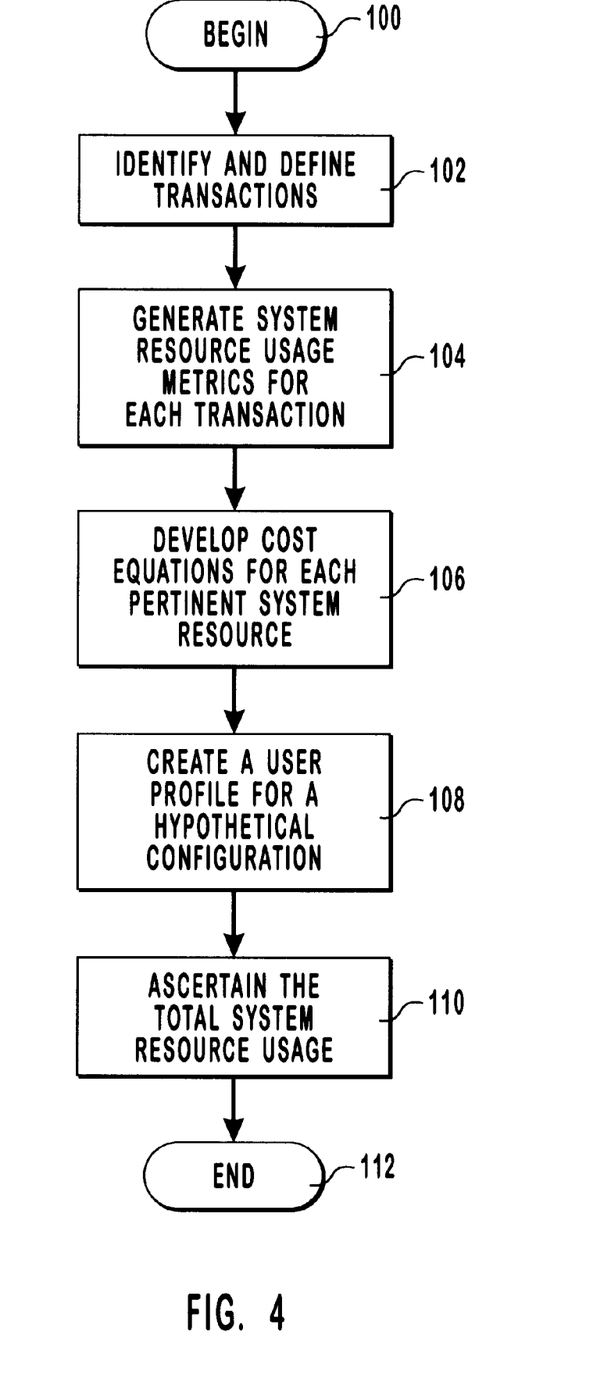
FIG. 4 is a flow chart showing the steps for creating a system resource usage model and for ascertaining the total system resource usage of a server application based on a hypothetical user profile.

Referring now to FIG. 4, a flow chart showing the steps taken in order to analyze a server application, generate system resource usage metrics or measurements for the different elements of server application use, and develop cost equations that can be used to create a model of total resource usage. These steps make up a methodology that allows cost equations and a subsequent model based on those cost equations to be built for virtually any server application. A model as created by the methodology of the present invention would aid a purchaser or system administrator in determining adequate system resources to handle the anticipated demand. Such models and cost equations are most effective for situations where a wide disparity exists on the types of user behavior and quantities of users that will be using a server application.

After beginning at step 100, certain transactions for the server application must be identified and defined. These will typically be a request, request/response sequence, or a series of request/response sequences that occur over a communications network between a client application and a server application. For example, a logon to the server application or a request for some sort of action on behalf of the client could each be considered a transaction.

In some instances, a single transaction can be defined that may consist of a number of request/response interactions over the communications network between the client application and the server application. Furthermore, certain transactions follow together such that for some purposes, such as for generating a load at the server application as explained hereafter, must occur together. For example, if a client application logs onto a server application, a log off transaction would necessarily be tied to and could be considered in many respects as part of the same transaction. Therefore, a log on/log off transaction alone may be defined in certain circumstances.

Furthermore, a single request or request/response from a client application may be characterized as multiple transactions if doing so will help in providing better and more accurate measurements of resource usage. It is important to note that the transactions as defined must be capable of measurement in some way at the server application since system resource usage measurements will be made for each transaction at step 104. A transaction therefore is something that can be wholly analyzed and measured at the server application so that a per transaction cost may be ascertained in terms of the different system resources being utilized or used.

Note also that, in order to identify and define the transactions appropriately at step 102, it is helpful, though not entirely necessary, to have some ideas as to user behavior being simulated. In other words, the way a user uses a client application will in turn determine how the client application interacts with the server application. Based on the original user interaction with the client application, the most relevant set of possible transactions may then be selected and eventually measured for resource usage leading to a more accurate and relevant model.

In step 104, resource usage measurements are made for each transaction in each resource used. The "cost" in terms of each of the relevant system resources is determined for each transaction. In other words, any time a particular transaction is performed, it will use or consume a certain amount of system resources and the step of making the resource usage measurements is determining those costs on a per transaction basis. Generally speaking, the behavior of users can eventually be reduced to transaction rates of the various defined transaction. One way of generating the system resource usage measurements for individual transactions will be shown hereafter in connection with the discussion of the flow chart in FIG. 5.

Once the resource usage measurements have been determined for each transaction in step 104, total cost equations may be developed for each pertinent system resource at step 106. Such cost equations will take as a component any resource usage attributed to a particular transaction. In other words, each relevant system resource will have a cost equation that takes as input the transaction rate of all relevant transactions contributing to the use of that particular system resource. All defined transactions are represented in the cost equation for a given system resource unless executing the transaction does not use the resource at all. The more transactions that are defined, the more complex the cost equation tends to be since it may have many more components.

After developing a complete set of cost equations representing each of the system resources to be monitored, it becomes a relatively simple matter to implement the cost equations into a computer program or spread sheet. This allows a model of the system resource usage requirements of the server application to exist that can be used to arrive at total system resource usage based upon given transaction rates. In other words, the system resource usage model is essentially the aggregate or set of system resource cost equations implemented in some form of computational system having a user interface that is more convenient for inputting the necessary information.

In order to obtain a sense of total system resource usage, certain user behavior information and anticipated numbers of users must be used in conjunction with the system resource cost equations. This is done in order to determine the amount of resources needed for a particular server application in a particular situation or configuration. Such user information and quantities of users are collected into a user profile for the hypothetical configuration. This user profile may contain the following information given by way of example and not of limitation: the number of anticipated users, individual user usage rates of the various functions available to the user through the user interface, parameters indicating length of data objects manipulated by the user, etc.

It is important to note that everything in the user profile can be used to readily determine how the client application will interact with the server application in terms of transactions. In other words, user behavior profiled in a user profile either directly, or indirectly through translation, can be reduced to transaction rates and transaction parameters that can be placed into the set of system resource cost equations.

Given the set of system resource cost equations, and the input for those equations in terms of transaction rates based upon a user profile, the total system resource usage may be computed at step 110 before ending at step 112. This total system resource usage will give an indication as to how much CPU power is needed, necessary disk space, an amount of network bandwidth representing the anticipated load caused by interaction with the various client applications, etc. With this information, a purchaser of a server application will know whether existing hardware that he may already own is sufficient to handle the anticipated load or if more hardware need be purchased. This removes the guess work or interpolation required in prior methods for determining hardware resources for a particular server application under a particular anticipated load caused by a hypothetical configuration. Again, with a certain degree of reliance, a purchaser of a server application may know that the correct hardware has also been purchased in order to accommodate the anticipated system resource usage based upon the anticipated load.

Each of the previously explained steps of FIG. 4 will be shown in an actual example shown hereafter that will illustrate in more detail how such methodology can be used. Collectively, these steps allow the creation of a set of cost equations that can be used to estimate total system resource usage for a certain amount of load applied to a server application and can be readily implemented into a resource usage model.

Figure 5:
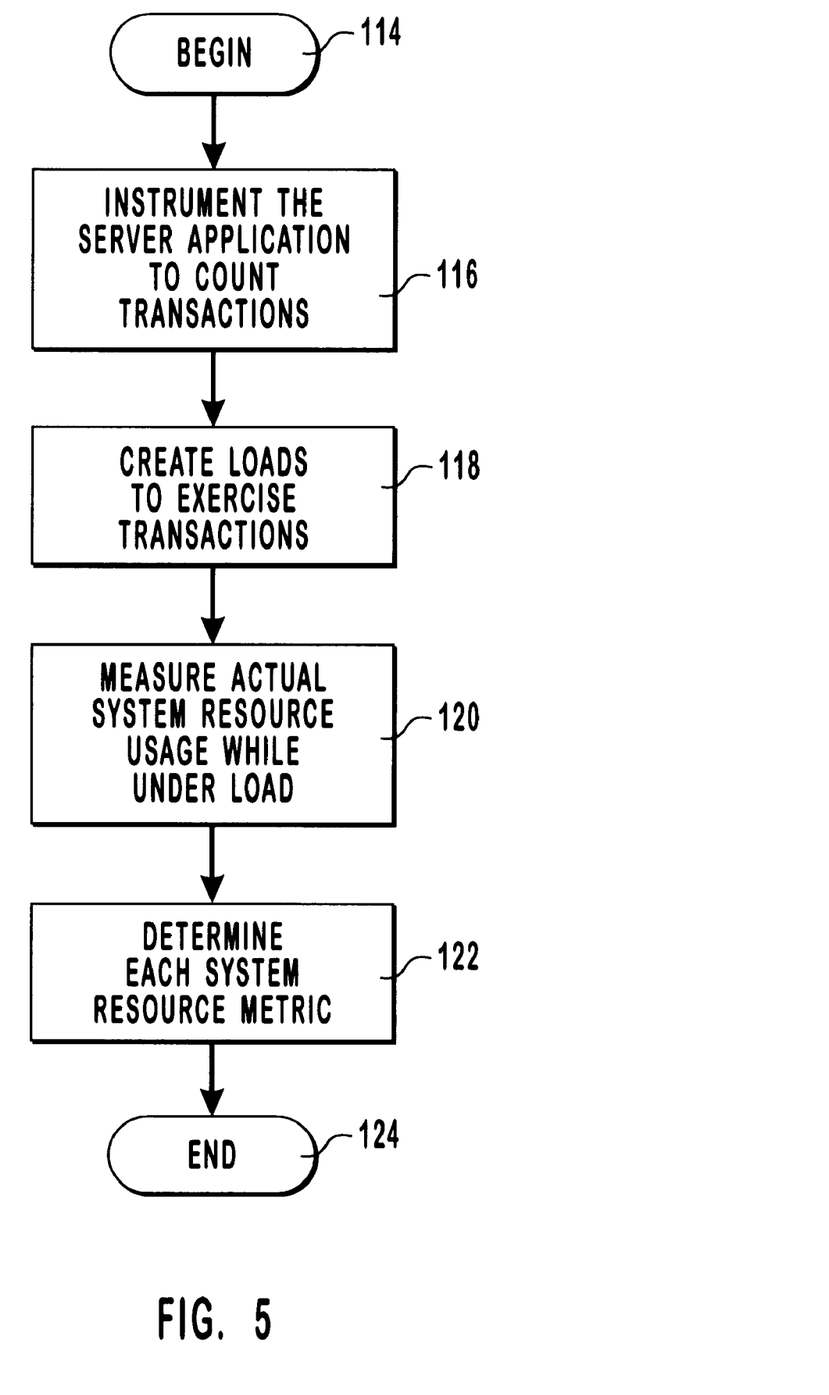
FIG. 5 is a flow chart showing the steps for instrumenting and determining the amount of system resource usage for each transaction making up some particular user behavior.

Referring now to FIG. 5, the steps taken in order to generate system resource usage measurements for each identified transaction are shown. The steps of FIG. 5 are simply one way of accomplishing step 104 of FIG. 4 and those skilled in the art will appreciate that different ways and means may be used to determine the cost, in terms of each relevant system resource, for each of the identified transactions. Note that for purposes of this invention it is only important that such cost has been accurately determined.

After beginning at step 114, modifications are made to the server application at step 116 so that it is "instrumented" to count designated transactions as they occur. As mentioned previously, a transaction must be something that is recognized at the server application, therefore, the addition of counters that count transactions can be made with relative ease. The counters will assist in making rate calculation such that a number of transactions made over a certain amount of time will give a transaction rate.

At step 118, loads are created external to the server application that cause the transactions to be exercised. By isolating the loads to exercise a single transaction, ideally, or a relatively small group of transactions, any system resource used during the presentation of the load can be attributed to the operation of that particular transaction. For example, a load generator may continually make log in and log out requests to the server application so that the resource usage for that paired transaction may be accurately measured. Note that with a load generator, the transactions need not occur in the sequence, same relative proportions, or even at the same time as would naturally occur by a user interacting with the user interface of a client application. Indeed, better results may be obtain by "focusing" as close as possible to one transaction at a time so that any system resource use measured can be attributed thereto.

While the server application is exposed to the load, actual system resource usage is measured at step 120. Many tools currently exist that will measure different resource usage that can be utilized for this purpose. For example, it is common to measure the percent of CPU utilization while a computer system is operating as part of determining general system use. With the additional information of the type and number of CPUs operating combined with the number of transactions made, a numerical cost may be derived for the amount of CPU that was used by an individual transaction. Similarly, such calculations may be made for other resources as they were also measured while being exposed to a load attributed to a particular transaction. Again, those skilled in the art will recognize many different mechanisms, conventions, tools, and methods for determining or monitoring usage of system resources.

Determination of each system resource usage measurement occurs at step 122. This may be done by dividing a total resource usage by the number of a particular transaction that were counted by a counter or other way that will yield a per transaction value. The end result is that for each given transaction, there will exist all relevant system usage "costs" associated therewith. At this point, the methodology end at 124 and the system resource usage measurements will have been generated or determined for each transaction as is necessary for step 104 of FIG. 4. Hereafter, a detailed example will be shown that explains what kinds of measurements are made and how the system resource usage for each transaction may be determined.

Figure 6:
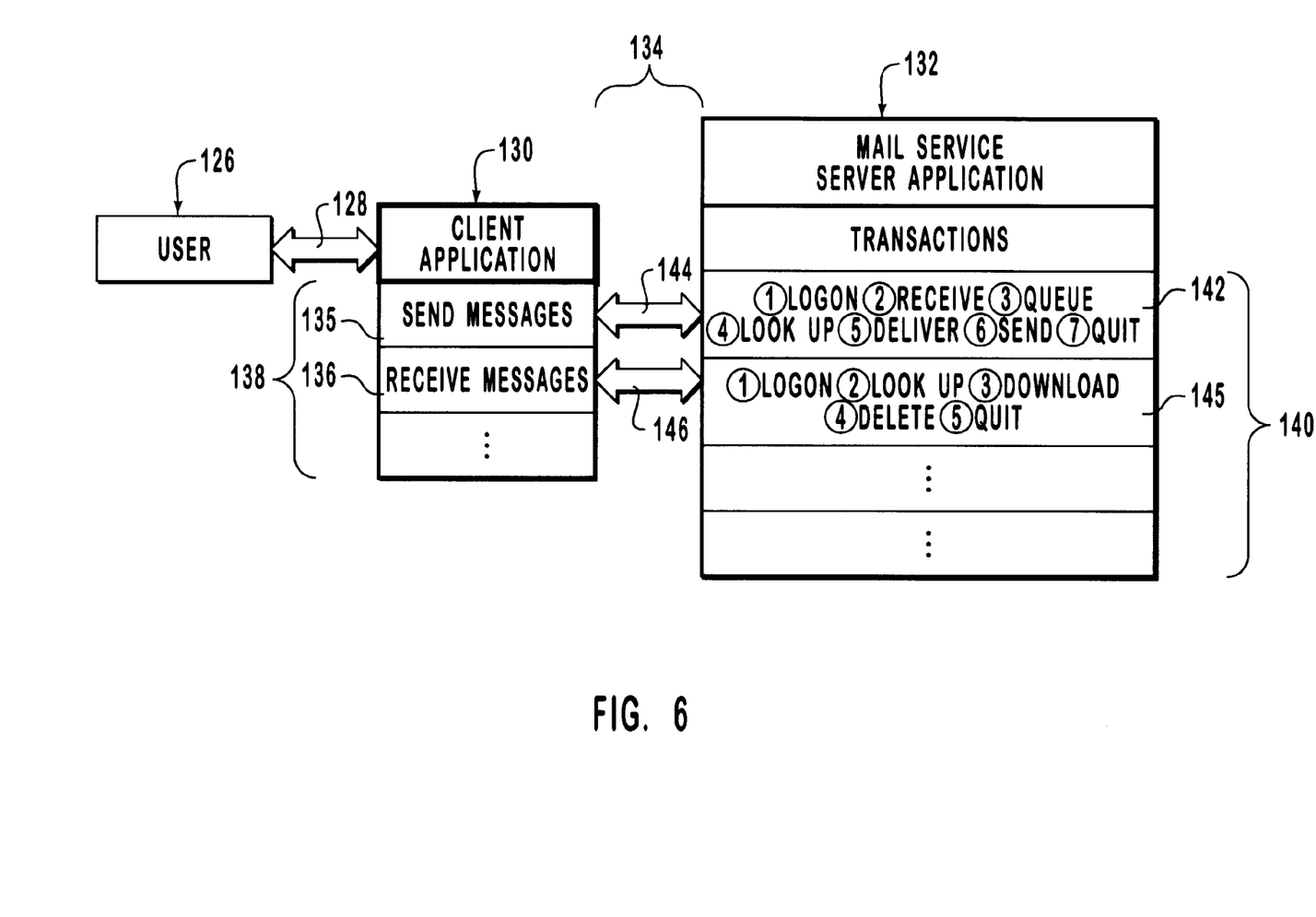
FIG. 6 is a logical diagram similar to that shown in FIG. 2 with specific application to the example used throughout of a mail service server application and wherein a client application interacting with a mail service server application is shown with the client application having two defined user behaviors, namely that of sending a message and that of receiving a message, and the mail service server application showing the defined transactions associated with each of the client application user behaviors.

Referring now to FIG. 6, a logical diagram representing an example mail service server application that is modeled according to the methodology of the present invention is shown. A user 126 will interact through a user interface 128 with a client application 130 that interacts with the mail service server application 132 through a communications network 134. The general details on the mode of interaction were explained previously in connection with the general logical diagram of FIG. 2 and such details will not be repeated here.

Essentially, two basic user behaviors are represented in the logical diagram of FIG. 6. The first user behavior is for receiving and reading new messages that have been delivered to the user on an account as part of an on-line service, such as Compuserve® or America On Line (AOL). The next user behavior is sending messages that the user 126 creates at the client application 130 to others either having accounts with the on-line subscription service or external destination over the Internet. The send messages 135 and the receive messages 136 user behavior are part of a total group of user behavior as represented by the bracket 138. Note that for purposes of this example, only two of the user/client application activities, namely the send messages 135 and the receive messages 136 user behavior, of the total group of potential activities are analyzed as part of this example.

On the other side of the communications network 134, the mail service server application 132 has a corresponding group of transactions that have been identified and defined for the corresponding user/client behavior. This total group of transactions is enclosed by bracket 140. Note that the send messages user behavior 135 corresponds with the set of transactions 142 as indicated by the arrow 144 and the receive messages user behavior 136 corresponds to the set of transactions 146 as indicated by the arrow 146. Arrows 144 and 146 show the interaction between the client application and the mail service server application 132 over the communications network 134.

The user 126 will begin by preparing messages for delivery to others using the client application 130 provided by the on-line service on the client computer. After such messages are prepared, the user 126, through the client application 130, will log onto the on-line service and access the mail service server application 132, most likely through a direct modem connection to a locally available communications network 134 that allows communication between the client application 130 and the mail service server application 132. With the connection thus made, the client application 130 will upload the messages to the mail service server application 132 for delivery. Finally, the mail service server application 132 will deliver the messages either locally to another on-line service subscriber account or remotely across the Internet or other communication network to a non-local destination.

The set of transactions 142 corresponding to send messages activity 135 are defined in greater detail in the table below.

TABLE 1

Send Messages User/Client Behavior

| Transaction | Description |
| --- | --- |
| Logon | The client application 130 logs onto the mail service server application 132 by sending a request across the communications network 134. This establishes the communication link between the client application 130 and the mail service server application 132. |
| Receive Message | The mail service server application 132 receives a message for delivery. Note that a message may be delivered locally or sent externally over the Internet. |
| Queue Message | The mail service server application 132 queues the message for delivery. The queue will only be used when large numbers of messages are being sent by multiple client applications. |
| Look Up Mailbox | The mail service server application 132 will perform a look up internally to determine if and where a mailbox for the intended recipient resides within the server. Note that the mail service server application 132 assumes that there will be an internal mailbox initially. |
| Deliver Message | The mail service server application 132 will deliver the message to the internal mailbox if previously found during the look up transaction. |
| Send Message | The mail service server application 132 will send the message to the intended recipient at a desired destination over the Internet if a local mailbox was not found. |
| Logoff or Quit | The client application 130 will disconnect from mail service server application 132 by sending a request indicating a desire to logoff. |

The general scenario for reading new messages delivered to an on-line service subscriber or user 126 includes first logging onto the on-line service in order to make the logical connection through the communications network 134 between the client application 130 and the mail service server application 132. Next, any messages received for a particular user 126 are downloaded to the client application 130 so that the connection need not be maintained indefinitely. Typically, once the messages are downloaded, the logical connection between the client application 130 and the mail service server application 132 is terminated. Finally, the user may use and peruse the messages leisurely on the client computer using the client application 130.

The set of transactions 146 defined for the receive messages activity 136 are defined in greater detail in the table below.

TABLE 2

Receive Messages User/Client Behavior

| Transaction | Description |
| --- | --- |
| Logon | The client application 130 logs onto the mail service server application 132 by sending a request across the communications network 134. This establishes the communication link between the client application 130 and the mail service server application 132. |
| Look Up Mailbox | The mail service server application 132 will perform a look up internally for the mailbox of the user 126 where a number of messages may have been received and are waiting for the user 126 to access. |
| Download Messages | The mail service server application 132 will download the messages from the mailbox corresponding to user 126 to the client application 130 |
| Delete Messages | The mail service server application 132 will delete the messages from the mailbox since the user 126 now has access to them at the client application 130. |
| Logoff or Quit | The client application 130 will disconnect from mail service server application 132 by sending a request indicating a desire to logoff. |

Figure 7:
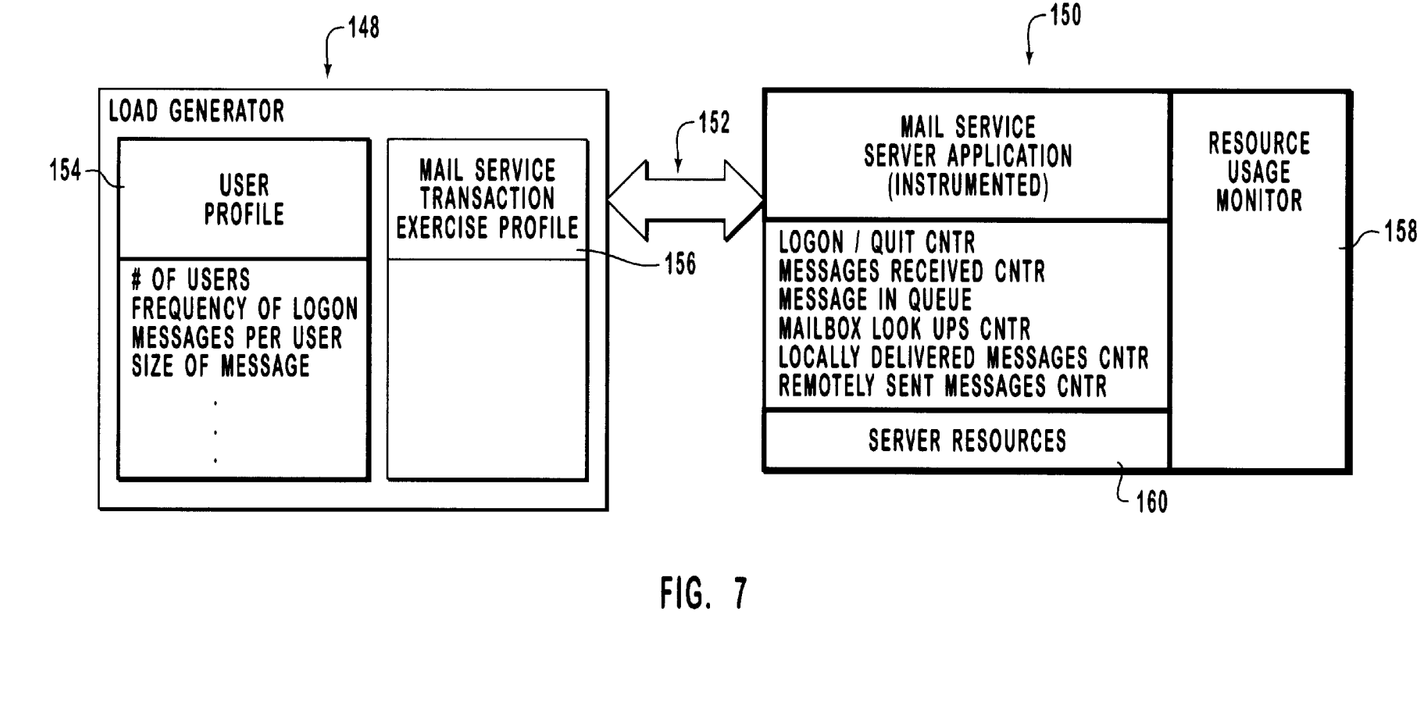

Referring now to FIG. 7, a logical diagram presenting a load generator having a user profile including user behavior information and mail service transaction exercise profile is shown that will interact with an instrumented mail service server application in order to determine the resource usage measurements is shown. The load generator 148 will interact with the instrumented mail service server application 150 over a communications network 152.

As part of the load generator 148, information regarding user behavior will be found and stored in a user profile 154 that can be used to simulate a particular hypothetical configuration. This will include the number of users, the frequency of log on per user, messages sent or received per user, the size of each message, etc. The user profile 154 information can be used to simulate a load caused by the hypothetical configuration described therein on the mail service server application 150.

Simulating the load of a hypothetical configuration and then measuring total actual resource usage is distinguished from estimating total resource usage using a model created by the present invention. Estimations can be made more quickly and do not require an actual load to be generated. There are instances when it is desirable to generate an actual load, such as when the model accuracy is to be tested by comparing the estimated total resource usage value with an actual measured value while under a load.

Also included as part of the load generator is a mail service transaction exercise profile 156 that can be used by the load generator 148 to exercise the different transactions previously defined for the mail service. This will be used to create a load against the mail service server application 150 in order to determine the individual costs associated with each transaction.

The user profile 154 may have important information that can be used by the mail service transaction exercise profile for exercising the instrumented mail service server application 150 depending on implementation. Note that in some instances or other embodiments that the user profile 154 and the mail service transaction exercise profile 156 may be combined together or distributed across multiple files or sources of information, such as a database. The important thing to remember regarding the load generator is that based on some information regarding the user and the defined and identified transactions, that a load is generated that is realistic or simulates actual user behavior in order to determine accurate costs on a per transaction basis. Typically, the user profile 154 can be eventually reduced to transactions or transactions rates. The two profiles are shown since the load generator may use the user profile 154 information to simulate a load on the mail service server application 150 to test the resource usage estimates derived from the resource usage equations.

The instrumented mail service server application 150 has certain counters therein to count the different transactions and other activities. Listed therein are a logon/quit counter, messages received counter, messages in a queue, mailbox lookups counter, the locally delivered messages counter, and the remotely sent messages counter. These counters are used to determine transaction rates and for assessing the individual resource costs. Finally, a resource usage monitor 158 is used to measure the resource usage while the instrumented mail service server application 150 is exposed to a load.

Note that the resource usage monitor may be built into or a part of the mail service server application 150 or may be another application program or instrumentation external to the computer system that is able to monitor the server resources 160. Many such devices in a number of different varieties are known in the art and are available for use with the current methodology.

Initially the transactions that make up the user/client application behavior are identified and defined as shown previously in the previous tables. Such identification and definition of transactions corresponds to FIG. 4 step 102. Furthermore, all the relevant system resources to be monitored for usage have also been determined. For this example, the resources monitored were chosen to be CPU cost, disk cost, network cost, and memory cost.

In order to measure the cost of a combined logon and quit transaction, the load generator would generate a load executing only logon and quit requests directed to the instrumented server application 150 (FIG. 7). The measurements from the logon and quit counter can be used to calculate a per second rate of logons and quits that are occurring at the instrumented mail service server application 150. By combining this rate with the overall resource utilization, the cost for a single transaction can be determined. Furthermore, the load generator may increase the number of clients doing logon and quit operations in order to get better information by creating ever increasing loads on the instrumented mail service server application 150.

In the case of a logon and quit, only one resource is used to any degree and that is the CPU. Therefore, the CPU cost is the only resource measured. Below is a table showing the CPU utilization of a server having four 100 megahertz Pentium processors that is used to give an average cost per log on and quit in terms of megahertz.

TABLE 3

CPU Cost per Logon and Quit Combined Transaction

| # of Clients | Logon/ Quits per Second | CPU Utilization | Cost per Logon/Quit |
|---|---|---|---|
| 1 | 10 | 12% or 48 MHz | 4.8 MHz |
| 3 | 30 | 30% or 120 MHz | 4 MHz |
| 5 | 50 | 55% or 220 MHz | 4.4 MHz |
| 7 | 70 | 78% or 312 MHz | 4.5 MHz |
| 9 | 80 | 97% or 388 MHz | 4.85 MHz |

By analyzing the above table, it can be seen that the average cost per log on and quit is approximately 4.5 megahertz. Note that as CPU utilization approaches 100% (e.g., 97% CPU utilization for 80 log on's and quit's per second) that the cost begins to increase due to the server being pushed beyond it's optimal capacity for servicing this transaction. By loading a server application, many sorts of bottlenecks may be discovered and resolved.

Those skilled in the art will note that there are many different ways and means for generating loads and that the above example represents only one of such. Furthermore, more or less accuracy in the numbers may be attained depending on the efforts desired by the constraints facing person applying the inventive methodology herein. The key point is to arrive at a cost in terms of each relevant system resource for each individual transaction defined and identified.

The two tables below show the total costs for all the transactions associated with the receive messages behavior and the send messages behavior. Each cost in the table was determined in an appropriate manner to the nature of the resource being monitored as was done with the logon/quit transaction shown in greater detail above. Those skilled in the art will recognize many different ways of arriving at the data consolidated in Table 4 and Table 5 below that represent the system resource usage measurements for each identified transaction performed by the server application for each relevant system resource.

TABLE 4

Resource Cost per Send Message User/Client Behavior

| Transaction | CPU Cost | Disk Cost | Network Cost | Memory Cost |
|---|---|---|---|---|
| Logon/Quit | 4.5 MHz | N/A | N/A | 15 KB |
| Receive Message | 9 MHz | 1 read, 3 writes | (Message Size + Header)/8 | 100 KB |
| Look Up Mailbox | 1.6 MHz | 1 read | ~15 bytes | 1 KB |
| Deliver Message | 10.2 MHz | 1 read, 2 writes | (Message Size + Header)/8 | N/A |
| Send Message | 8 MHz | 1 read, 2 writes | (Message Size + Header)/8 | N/A |

TABLE 5

Resource cost per Receive Message User/Client Behavior

| Transaction | CPU Cost | Disk Cost | Network Cost | Memory |
|---|---|---|---|---|
| Logon/Quit | 10 MHz | N/A | N/A | 15 KB |
| Look Up Mailbox | 1.6 MHz | 1 read | ~15 bytes | 1 KB |
| Download and Delete Message | 6 MHz | 1 read, 1 write | (Message Size + Header)/8 | 100 KB |

Note that the Logon/Quit CPU cost is 4.5 MHz for the send message behavior shown in Table 4 while the Logon/

Quit CPU cost is 10 MHz for the receive message behavior shown in Table 5. The difference in cost occurs because the Logon/Quit transaction for the receive message behavior is defined to include authentication of the user so that it uses more CPU resources. On the other hand, there is no authentication required for the user in a send message behavior.

With the individual transaction cost information in tabular form as shown above, it becomes an easy task to construct cost equations for each of the various system resources. Equations may be created for each relevant system resource by multiplying the cost of each transaction for the relevant resource by the number of occurrences of those particular transactions. Each of these will provide a component or element of the total cost and can therefore be summed together to arrive at the total usage for that particular resource due to the user behavior that make up the various transactions. Finally, the total number of anticipated users may be multiplied across the summation of these individual components in order to arrive at the total usage for all users. For example, the resource usage equation for the send messages behavior in terms of CPU usage is given by the following equation:

$$CPU_{send}=U*(LQ*4.5+RM*9+LU*1.6+DM*10.2+MS*8)$$

where U is the number of users, LQ is the logon and quit combined transactions per second, RM is the received messages per second, LU is mailbox look up's per second, DM is the delivered messages locally per second, and SM is the sent messages per second. Similarly, CPU cost equation for the receive messages behavior is given by the following equation:

$$CPU_{receive}=U*(LQ*10+LU*1.6+DD*6)$$

where U is the number of users, LQ is the logon and quit combined transactions per second, LU is mailbox look up's per second, and DD is the download and delete messages transaction taken per second.

Similar equations can be generated for disk access, network bandwidth usage, and memory utilization can be created as shown below:

$$DISK_{send}=U*(RM*(1rd+3wr)+LU*1rd+DM*(1rd+2wr)+MS*(1rd+2wr))$$

$$NETWORK_{send}=U*((RM+DM+MS)*((Message+Header)/8)+LU*15)$$

$$MEMORY_{send}=U*(LQ*15+RM*100+LU)$$

$$DISK_{receive}=U*(LU*1rd+DD*(1rd+1wr))$$

$$NETWORK_{receive}=U*(DD*((Message+Header)/8)+LU*15)$$

$$MEMORY_{receive}=U*(LQ*15+DD*100+LU)$$

With a complete set of cost equations, the model for estimating total resource usage requirements is completed. These equations may be programmed into a spreadsheet or implemented into a stand-alone computer program or otherwise used in order to arrive at calculations designed to give reliable total system resource usage estimated. In one implementation, a user profile is created that has all relevant data to simulate a certain anticipated number of users interacting with the mail service server application along with parameters or settings regarding the type of that behavior such that the totality of the profile information may be reduced to transaction rates. Once the user profile information is reduced into transaction rates, the set of cost equations may be used to calculate total resource usage.

With the total resource usage numbers, a purchaser, system administrator, or other interested party of the mail service server application will know the correct amount of hardware and other system resources necessary in order to adequately service the anticipated load.

For example, a user profile may have information that a user logs on once per day and that the user will write five messages. Each message in turn will be five KB in length and be addressed to two recipients. One recipient is local to the subscription or mail service and one remote, thus requiring that the message be sent over the Internet. Additionally, the mail service server application will support 100,000 users and will be available 20 hours a day with a peak usage being two times the average usage.

Initially, we calculate the number of users per second accessing the mail service server application and arrive at a value of 1.4 users/second for U and generating messages for the send messages user/client behavior at a rate of 7 messages/second as shown below:

$U$=100,000 users (20 hours * 3600 seconds/hour)=1.4 users/second and

Messages=$U$*5=1.4*5=7

The message information is used to determine some of the transaction rates that can be used in the cost equations. Since each message is sent to two recipients, one local and one remote, we arrive at the following transaction rates: LQ=1.4 since each user will logon/quit one time per session, RM=7 since each message is received, LU=14 since each message has two recipients and a look up is performed for each message sent or delivered, DM=7 since one recipient is local, and MS=7 since one recipient is remote. Applying the user access rate and transaction rates as now determined and placing them in the CPU cost equation for the send messages user/client behavior as shown below:

$$CPU_{send}=U*(LQ*4.5+RM*9+LU*1.6+DM*10.2+MS*8)$$

$$CPU_{send}=1.4*(1.4*4.5+7*9+14*1.6+7*10.2+7*8)$$

$$CPU_{send}=306.74 \text{ MHz}$$

This result means that in order to handle the anticipated load created by the information contained in the user profile, a single Pentium processor running at 200 MHz would be insufficient but a system with four Pentium processors each running at 100 MHz would be a more suitable system. With similar ease, the other resource requirements may be readily calculated.

The calculations made from the user profile can be verified with an actual load placed on the mail service server application in order to assure that the cost equations have been developed properly and have acceptable accuracy. This may be done by setting up an actual configuration that generates such a load and then measuring resource usage or by using the load generator with the user profile information in order to generate a load onto the mail service server application simulating the actual configuration.

Once the equations have been verified, the equations can be implemented in a model that may be distributed to field service representatives that may use it to assist a wide range of purchasers in accurately estimating adequate hardware resources to service the mail service server application under the anticipated load. Those skilled in that art will also see many other areas where the model thus created may be used beneficially in a variety of circumstances and under different conditions.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for estimating system resource usage requirements of a server application comprising:
   a specific act of defining a set of transaction types performed by the server application in response to user behavior of a client application;
   a specific act of identifying a set of server application system resources to be measured;
   a specific act of generating system resource usage measurements for each defined transaction type performed by the server application and for each identified system resource;
   a specific act of developing at least one system resource cost equation for each identified system resource, wherein the system resource cost equation includes a component from each defined transaction type, wherein the system resource cost equation is based on the system resource usage measurements so that user loads that are reduced to transaction rates are input into the system resource cost equation to estimate resource usage; and
   a specific act of a user using the estimated resource usage to configure the server application.

2. A method as recited in claim 1 wherein the system resource usage measurements are selected from the group consisting of CPU cost, disk cost, network cost, and memory cost.

3. A method as recited in claim 1 wherein the system resource usage measurements are generated by performing the following:
   a specific act of instrumenting the server application to count occurrences of each defined transaction type;
   a specific act of creating loads on the server application that exercise each defined transaction type;
   a specific act of measuring the actual usage of each particular system resource for each defined transaction type while under the created load; and
   a specific act of determining each system resource usage measurement by dividing the actual usage for each particular system resource by the count of transaction occurrences, said division done for each defined transaction type.

4. A method as recited in claim 3 wherein each defined transaction type in the server application is loaded separately.

5. A method as recited in claim 1 wherein the defined transaction types correspond to at least one access to the server application by the client application.

6. A computer-readable medium having computer-executable instructions for performing the specific acts recited in claim 1.

7. A method as recited in claim 1, wherein one of the transaction types includes receiving an electronic mail message.

8. A method as recited in claim 1, wherein one of the transaction types includes a combination of logging in and logging out of the server application.

9. A method as recited in claim 1, wherein the set of server application system resources include software resources.

10. A method as recited in claim 1, further comprising:
    a specific act of creating a user profile for a hypothetical configuration having information regarding the number of and behavior of users that are reduced to terms of transaction rates; and
    a specific act of ascertaining total system resource usage requirements of the server application for the hypothetical configuration by using the user profile information with the cost equations for each system resource to estimate the total system resource usage for the hypothetical configuration.

11. A method as recited in claim 10 wherein the system resource usage measurements are selected from the group consisting of CPU cost, disk cost, network cost, and memory cost.

12. A method as recited in claim 10 wherein the system resource usage measurements are generated by performing the following:
    a specific act of instrumenting the server application to count occurrences of each defined transaction type;
    a specific act of creating loads on the server application that exercise each defined transaction type;
    a specific act of measuring the actual usage of each particular system resource for each defined transaction type while under the created load; and
    a specific act of determining each system resource usage measurement by dividing the actual usage for each particular system resource by the count of transaction occurrences, said division done for each defined transaction type.

13. A method as recited in claim 12 wherein each defined transaction type in the server application is loaded separately.

14. A method as recited in claim 10 wherein the defined transaction types correspond to at least one access to the server application by the client application.

15. A computer-readable medium having computer-executable instructions for performing the specific acts recited in claim 10.

16. A method for creating a system resource requirement estimation model for a server application comprising:
    a specific act of defining a set of transaction types performed by the server application in response to user behavior of a client application;
    a specific act of identifying a set of server application system resources to be measured;
    a specific act of generating system resource usage measurements for each defined transaction type performed by the server application and for each identified system resource comprising the following:
      a specific act of instrumenting the server application to count occurrences of each defined transaction type;
      a specific act of creating loads on the server application that exercise each defined transaction type; and
      a specific act of measuring the actual usage of each particular system resource for each defined transaction type while under the created load;
    a specific act of developing at least one system resource cost equation for each identified system resource, wherein the system resource cost equation includes a component from each defined transaction type, wherein the system resource cost equation is based on the system resource usage measurements; and a specific act of providing for the receipt of hypothetical configuration information that simulates the number of and behavior of anticipated users in terms of transaction rates so that total resource usage is estimated by using the hypothetical configuration information combined with the developed cost equations.

17. A method as recited in claim 16 wherein each defined transaction type in the server application is loaded separately.

18. A method as recited in claim 16 wherein the system resource usage measurements are selected from the group consisting of CPU cost, disk cost, network cost, and memory cost.

19. A method as recited in claim 16 wherein the defined transaction types correspond to at least one access to the server application by the client application.

20. A method as recited in claim 16 further comprising the step of verifying the accuracy of the model by performing the following:

a specific act of generating an actual load on the server application based on hypothetical configuration information;

a specific act of measuring the actual system resource usage; and a specific act of comparing the actual system resource usage with the estimated system resource usage estimated from the developed cost equations.

21. A computer-readable medium having computer-executable instructions for performing the specific acts recited in claim 16.

22. A computer-readable medium having computer-executable instructions for estimating system resource requirements of a server software application given a user profile of a hypothetical configuration, wherein the computer-readable medium comprises computer-executable instructions for performing the following specific acts:

receiving a user profile of a hypothetical configuration that contains the number of users and the behavior of the users that are reduced to terms of transaction rates of identified transaction types performed by the server application;

computing a total estimated resource usage for the hypothetical configuration based on the user profile and system resource cost equations, each system resource cost equation developed from generated resource usage measurements of applicable identified transaction types performed by the server application; and showing the total system resource estimate of a customer configuration thereby allowing accurate planning on the part of the customer.

23. A computer-readable medium as recited in claim 19 wherein the system resource usage measurements are selected from the group consisting of CPU cost, disk cost, network cost, and memory cost.

24. A computer-readable medium as recited in claim 22 wherein the resource usage measurements are generated comprising the following specific acts:

instrumenting the server application to count occurrences of each identified transaction type;

creating loads on the server application that exercise each identified transaction type separately;

measuring the actual usage of each particular system resource for each identified transaction type while under the created load; and determining each system resource usage measurement by dividing the actual usage for each particular system resource by the count of transaction occurrences, said division done for each identified transaction type and system resource.

25. A computer-readable medium as recited in claim 22 wherein the identified transaction types correspond to at least one access to the server application by the client application.

* * * * *

UNITED STATES PATENT AND TRADEMARK OFFICE
CERTIFICATE OF CORRECTION

Page 1 of 2

PATENT NO. : 6,086,618
DATED : July 11, 2000
INVENTOR(S) : Hilal Al-Hilahi, Perry Clarke, David Edward Guimbellot, David Andrew Howell It is certified that error appears in the above-identified patent and that said Letters Patent are hereby corrected as shown below:

Fig. 2, item 74, label should read --User Interface--

Fig. 2, item 88, label should read --Hard Disk--

Col. 3, line 1, before "unless" change "guess work" to --guesswork--

Col. 3, line 28, after "reasonable" change "guess work" to --guesswork--

Col. 6, line 21, after "used" change "through out" to --throughout--

Col. 6, line 31, after "refers" insert --to--

Col. 7, line 12, before "system" change "the" to --The--

Col. 8, line 2, before "enterprise-wide" change "offices" to --offices,--

Col. 8, line 33, after "example of" insert --a--

Col. 12, line 34, before "at 124" change "end" to --ends--

Col. 12, line 20, after "amount of CPU" insert --power--

Col. 16, line 16, before "per" change "quit's" to --quits--

Col. 16, line 25, after "facing" insert --the--

Col. 17, line 30, after "and" change "SM is" to -- MS is --

UNITED STATES PATENT AND TRADEMARK OFFICE
CERTIFICATE OF CORRECTION

PATENT NO. : 6,086,618
DATED : July 11, 2000
INVENTOR(S) : Hilal Al-Hilahi, Perry Clarke, David Edward Guimbellot, David Andrew Howell

It is certified that error appears in the above-identified patent and that said Letters Patent are hereby corrected as shown below:

Col. 18, line 25, change "U=100,000 users (20 hours *3600 seconds/hour)=1.4 users/second" to --U=100,000 users/(20 hours *3600 seconds/hour)=1.4 users/second--

Col. 19, line 11, before "and not" change "illustrated" to -- illustrative --

Signed and Sealed this

Twenty-second Day of May, 2001

*Attest:*

NICHOLAS P. GODICI

*Attesting Officer*    Acting Director of the United States Patent and Trademark Office